Figure 1:
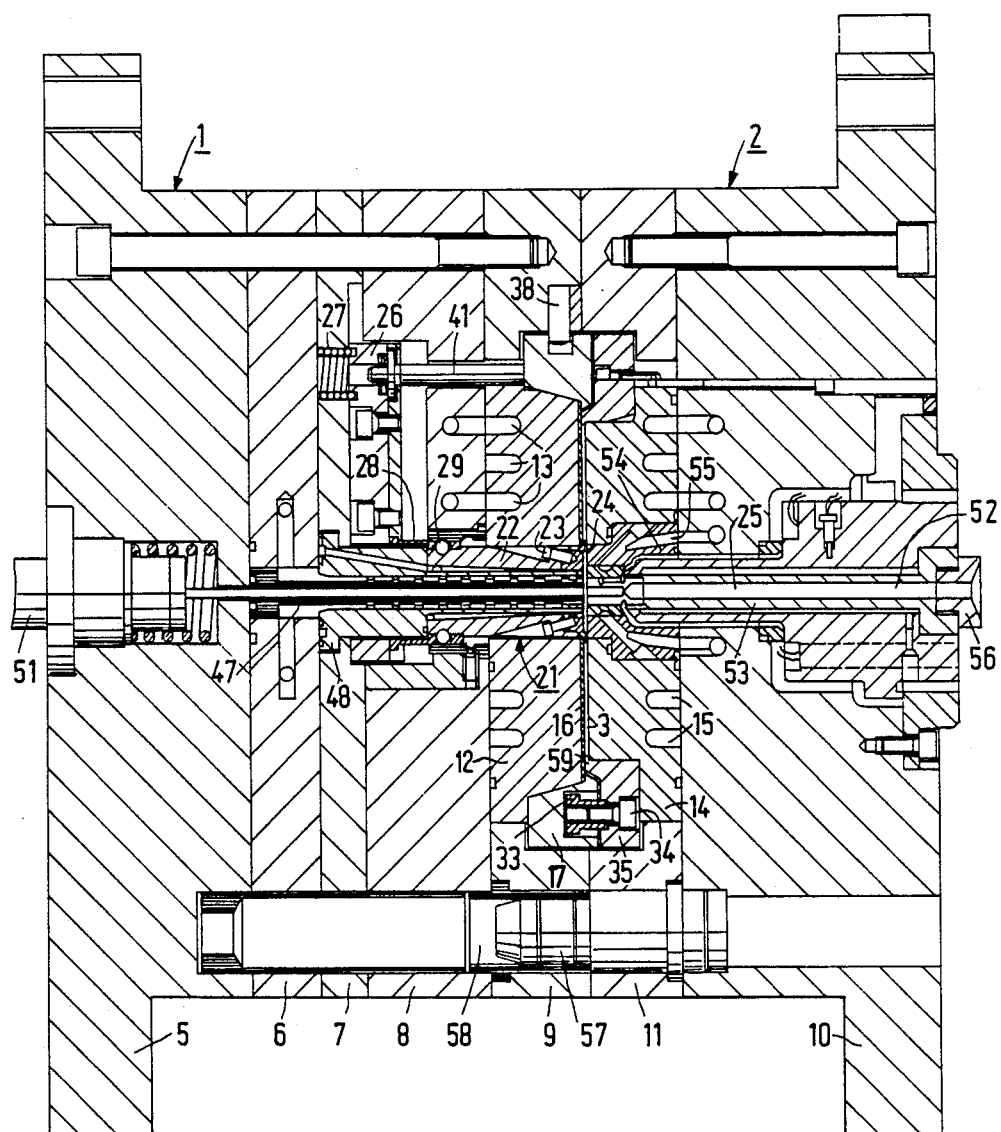

United States Patent [19]

Cools

[11] Patent Number: 4,917,833
[45] Date of Patent: Apr. 17, 1990

[54] METHOD OF MANUFACTURING INFORMATION DISCS FROM A SYNTHETIC MATERIAL BY AN INJECTION MOLDING DEVICE

[75] Inventor: Johannes H. J. Cools, Waalre, Netherlands

[73] Assignee: U.S. Philips Corporation, New York, N.Y.

[21] Appl. No.: 211,635

[22] Filed: Jun. 27, 1988

[30] Foreign Application Priority Data

Jun. 26, 1987 [NL] Netherlands .......................... 8701499

[51] Int. Cl.$^4$ .................... B29C 33/30; B29C 45/26
[52] U.S. Cl. ................................... 264/1.3; 264/40.1; 264/106; 264/328.1; 425/192 R; 425/810
[58] Field of Search .............. 264/1.3, 1.7, 106, 107, 264/40.1, 328.1; 425/810, 190, 192 R, 193, 590; 249/102–104, 160

[56] References Cited

U.S. PATENT DOCUMENTS 4,707,321 11/1987 Segawa et al. .......................... 264/1.3
4,789,320 12/1988 Sasamura et al. ..................... 425/810
4,790,738 12/1988 Shimojo et al. ....................... 264/106

FOREIGN PATENT DOCUMENTS 56-157334 12/1981 Japan ................................... 425/454
62-286718 12/1987 Japan ................................... 425/810
8403022 10/1984 Netherlands .

Primary Examiner—Jill L. Heitbrink
Attorney, Agent, or Firm—Norman N. Spain

[57] ABSTRACT

An injection-moulding method for manufacturing discs from a synthetic material, which discs are provided with an information structure on one side, such as CD records, having a mould having a first and a second mould section (1, 2) which are movable relative to one another between an open and a closed position and which in the closed position define a mould cavity (3) into which a molten synthetic material is injected to form the disc, and having a flat mirror plate (12) on the first mould section, a disc-shaped stamper (16) which is positioned against the mirror plate, a guard ring (17) which is detachable from the first mould section to cover the periphery of the stamper (16) in an operating position, and quick-fastening device (18–20) which is adapted to cooperate with the guard ring (17) to secure the guard ring to the first mould section in the operating position. For changing the stampers a coupling device (33, 37) is provided which is adapted to couple the guard ring (17) to the second mould section (2).

5 Claims, 6 Drawing Sheets

METHOD OF MANUFACTURING INFORMATION DISCS FROM A SYNTHETIC MATERIAL BY AN INJECTION MOLDING DEVICE

The invention relates to an injection-moulding device for manufacturing discs provided with an information structure on one side from a synthetic material, comprising: a mould having a first and a second mould section which are movable relative to one another between an open and a closed position, and between which in the closed position a mould cavity is defined into which a molten synthetic material is injected to form the disc; a flat mirror plate on the first mould section; a disc-shaped stamper which bounds a first side of the mould cavity and which is detachably secured to the mirror plate; a guard ring which is detachable from the first mould section, for covering the periphery of the stamper in an operating position; and a quick-fastening device which is adapted to cooperate with the guard ring for rapidly securing the guard ring to the first mould section in the operating position.

A prior-art injection-moulding device of the type defined in the opening paragraph employs a quick-fastening device mainly comprising a bayonet coupling system which can be driven by means of a hand-wheel.

The use of a quick-fastening device for the guard ring is desirable to enable stampers to be changed rapidly. Injection-moulding devices of the type described are employed, for example, in the fabrication of Compact Discs or CD records. Compact Discs are provided with a music program and are manufactured in runs in which varying quantities are produced depending on the orders on hand. Therefore, it is necessary to repeatedly change the stamper for a new production run. It will be evident that the time lost in changing the stamper means a loss of production and should therefore be minimised. In the prior-art injection-moulding device a stamper change is performed after termination of a production run, after which a starting run is initiated which yields reject products. It is not exceptional that the starting run results in 10 to 30 rejects. The necessity of a starting run resides in the fact that during a change of stamper the synthetic material being used, for example polycarbonate, slightly degrades in the feeder section of the injection-moulding device. Moreover, the thermal balance in the mould is disturbed when the new stamper is mounted, so that a number of cycles—each including closing of the mould, injection of the synthetic material and cooling, subsequent opening of the mould and removal of the product—are necessary in order to restore a stable temperature in the mould. The advantage of rapidly changing the stamper not only provides a direct gain of time and a production gain, but it also enables the starting batch to be reduced, which means that less rejects are produced and the injection-moulding device is sooner available for the fabrication of proper products. Therefore, it also means a production gain.

Although the injection-moulding device described in the foregoing is definitely an improvement in comparison with previous injection-moulding devices in which the guard ring has to be detached by the removal of a number of bolts, the time needed to change the stamper is still considered to be too long. Moreover, problems may arise because the guard ring has to be manipulated. For example, it may happen that the ring is dropped. The ring is accurately machined and may be damaged seriously when it falls. In the case of discs of a diameter larger than that of CD records, for example optical video discs, the mass of the ring is 4 kg, which means that it is comparatively heavy. The space available for manipulating the ring when the moulding cavity is open is not large. In injection-moulding devices for CD records, the mould opens for example over a distance of only about 20 cm. Therefore, it is not unlikely that the stamper on one mould section or the mirror plate on the other mould section is damaged during manipulation of the guard ring in the space between the two mould sections. Another problem is that care must be taken to ensure that the location where the guard ring is to be placed during a change of stamper is very clean, in view of the very stringent requirements imposed on the cleanliness to be observed in the fabrication of optical discs.

It is the object of the invention to provide an improved injection-moulding device of the type defined in the opening paragraph which enables a more rapid change of stamper without the risk of damage to the stamper, the mirror plate or the guard ring and which is characterized in that there is provided a coupling device for coupling the guard ring to the second mould section in the at least substantially closed position of the mould.

In the injection-moulding device in accordance with the invention, before the mould is fully opened, the guard ring is detached from the first mould section by means of the quick-fastening device and is coupled to the second mould section by means of the coupling device. When the mould is subsequently opened fully the guard ring remains temporarily attached to the second mould section. This means that the ring need not be manipulated and placed beside the injection-moulding device. Thus, changing the stamper may commence immediately.

Suitably, an embodiment of the invention is used which is characterized in that the stamper is detachably secured to a stamper support which is adapted to cooperate with a changer for rapidly changing the stamper when the mould is open and the guard ring is coupled to the second mould section. In this respect it is to be noted that a changer for changing the stamper is known per se. An example of such a changer is described in German Offenlegungsschrift 3,435,856 (herewith incorporated by reference). The disc-shaped stamper has a centre hole and is secured to one end portion of a changer sleeve. The other end of the changer sleeve comprises a portion which is adapted to cooperate with a changing mechanism provided in the first mould section. Each stamper is previously mounted on a changer sleeve. To change a stamper the changer sleeve is slid into a central opening in the first mould section so as to be moved into the operating position and locked by means of the changer mechanism. Removal of the stamper proceeds in a reverse sequence. The use of a combination of a coupling device for coupling the guard ring to the second mould section and a changer for the stamper enables stampers to be changed very rapidly with all the advantages already mentioned in the foregoing.

A further embodiment of the invention is characterized in that the coupling means couple the guard ring to the second mould section in a position which is accurately coaxial with the operating position of the guard ring on the first mould section. The advantage of this embodiment is that no radial displacement of the guard ring is necessary as in the case of manual removal of the guard ring. The smaller the required displacements of the guard ring are, the faster the stamper can be changed. Damaging of the stamper, the mirror plate or the ring is virtually excluded. The guard ring always remains in the same coaxial position on the injection-moulding device, except that during a stamper change the guard ring is situated on the second mould section instead of on the first mould section.

An embodiment of the invention which performs satisfactorily is characterized in that: the quick-fastening device comprises a first bayonet coupling; the coupling device comprises a second bayonet coupling; and in that the quick-fastening device comprises means for rotating the guard ring from the operating position to a coupling position, the first bayonet coupling being closed and the second bayonet coupling being open in the operating position and the first bayonet coupling being open and the second bayonet coupling being closed in the coupling position. This embodiment simplifies the construction of both the quick-fastening device and the coupling device. In fact, both devices are combined with one another and require only a few moving parts in the first mould sections, namely only those moving parts which rotate the guard ring. The second mould section only carries a number of stationary bayonet parts, whilst the first mould section also carries a number of stationary bayonet coupling parts.

A further integration can be obtained by means of another embodiment which is characterized in that: the stamper support can be latched in the first mould section, the quick-fastening device in the first mould section comprises parts which are movable and which are adapted to cooperate both with the stamper support and with the guard ring; and while the guard ring is coupled to the second mould section said movable parts release the stamper support when the mould is opened.

When an injection-moulding device in accordance with the invention is utilised which, in addition to a coupling device for the guard ring, also comprises a stamper changer an advantageous method in accordance with the invention may be used. The method in accordance with the invention relates to the fabrication of discs in production runs comprising a plurality of production cycles, each comprising the following steps: closing the mould—injecting and cooling the synthetic material—opening the mould—removing the product, the stamper being changed after every production run, after which a starting run is performed which comprises starting cycles comprising the same steps as the production cycles but yielding a reject product, after which the next production run may commence. The invention is characterized in that: the method is carried out under control of a control device which automatically controls the sequence of successive production runs, stamper changes and starting runs; the products are removed from the mould by means of a mechanical product manipulator; a mechanical stamper manipulator is provided for changing the stamper; each stamper change is carried out in a fixed time interval and comprises the following steps: coupling the guard ring to the second mould section towards the end of the last production cycle of a production run by actuating the quick-fastening device and the coupling device, releasing the stamper support from the first mould section by actuating the stamper changer after removal of the last product of the production run from the open mould, removing the stamper support with the stamper from the first mould section by means of the stamper manipulator, positioning the next stamper support with the next stamper on the first mould section by means of the stamper manipulator, securing the stamper support to the first mould section by actuating the stamper changer, and securing the guard ring to the first mould section by actuating the coupling device and the quick-fastening device prior to the beginning of the first starting cycle of the next starting run.

In this respect it is to be noted that for removing products from a mould it is known per se to use a mechanical product manipulator, also referred to as a robot. In principle it is also possible—and it may provide substantial advantages—to employ the product manipulator also as the stamper manipulator. Generally, this means that it will be necessary to replace that part of the manipulator which directly removes the products by another part, namely one which is adapted to remove the combination of stamper and stamper support. This replacement may be carried out, preferably automatically, by the robot in the time interval in which the guard ring is coupled to the second mould section and the mould is opened.

The invention permits the use of an automatic control device because stamper changes are carried out automatically and hence may always take place in exactly the same time interval. This means that the afore-mentioned effects with respect to the degeneration of the synthetic material in the feeding section of the injection-moulding machine and the thermal balance in the mould are always the same and are thus fully predictable. This enables the starting run to be reduced to an absolute minimum. An excess number of starting cycles in order to ensure that the first products of the production run following the starting run actually meet the quality requirements is not needed in view of the said predictablity of the effects which occur.

An embodiment of the method is characterized in that each starting run comprises the same number of starting cycles. The number of starting cycles in a starting run may even come close to zero as the automatic stamper change proceeds more rapidly.

To minimise the number of starting cycles in a starting run another embodiment of the inventive method is important, which is characterized in that the stamper for the next production run is kept at hand in preheated condition in the direct proximity of the mould. Depending on the type of synthetic material used and the corresponding injection-moulding temperature the speed with which the stamper can be changed automatically and the extent to which the preheated stamper complies with the temperature conditions in the injection-moulding device during injection-moulding of production batches, it is in principle even possible to obtain a starting run which no longer comprises any starting cycles and which may therefore, in principle, be skipped completely. Until now it has not been demonstrated that it is feasible, but it should definitely be considered as potentially feasible.

There is a trend to minimise the bulk of the air-treatment plants needed in the fabrication of optical discs. These plants constitute a significant cost-raising factor as a result of their substantial bulk and the high investment they require. Therefore, there is a tendency to provide conditioned air only at those locations where this is absolutely indispensable, i.e. where the naked information surface of the stamper or the product is directly exposed to the ambient air at a given instant in the production process. An embodiment of the method which helps to reduce the bulk of the air treatment plants is characterized in that: in an air conditioned space the stamper is positioned on the stamper support and is loaded into a magazine which can be closed in a dust-tight manner; the closed dust-tight magazine thus loaded is placed at a predetermined location near the injection-moulding device and the stamper support with the stamper is not removed from the magazine until a stamper change is to be performed and is not reinserted therein until after termination of the relevant production run. This embodiment is suited to be combined with the preceding embodiment by utilising the closed magazines also for preheating the stampers contained therein. The magazines may, for example, be provided with a builtin heating device.

The method in accordance with the invention can be rationalised further by the use of a further embodiment which is characterized in that automatic transfer means are provided to transfer the magazine between the air-conditioned space and the said predetermined location.

Figure 2:
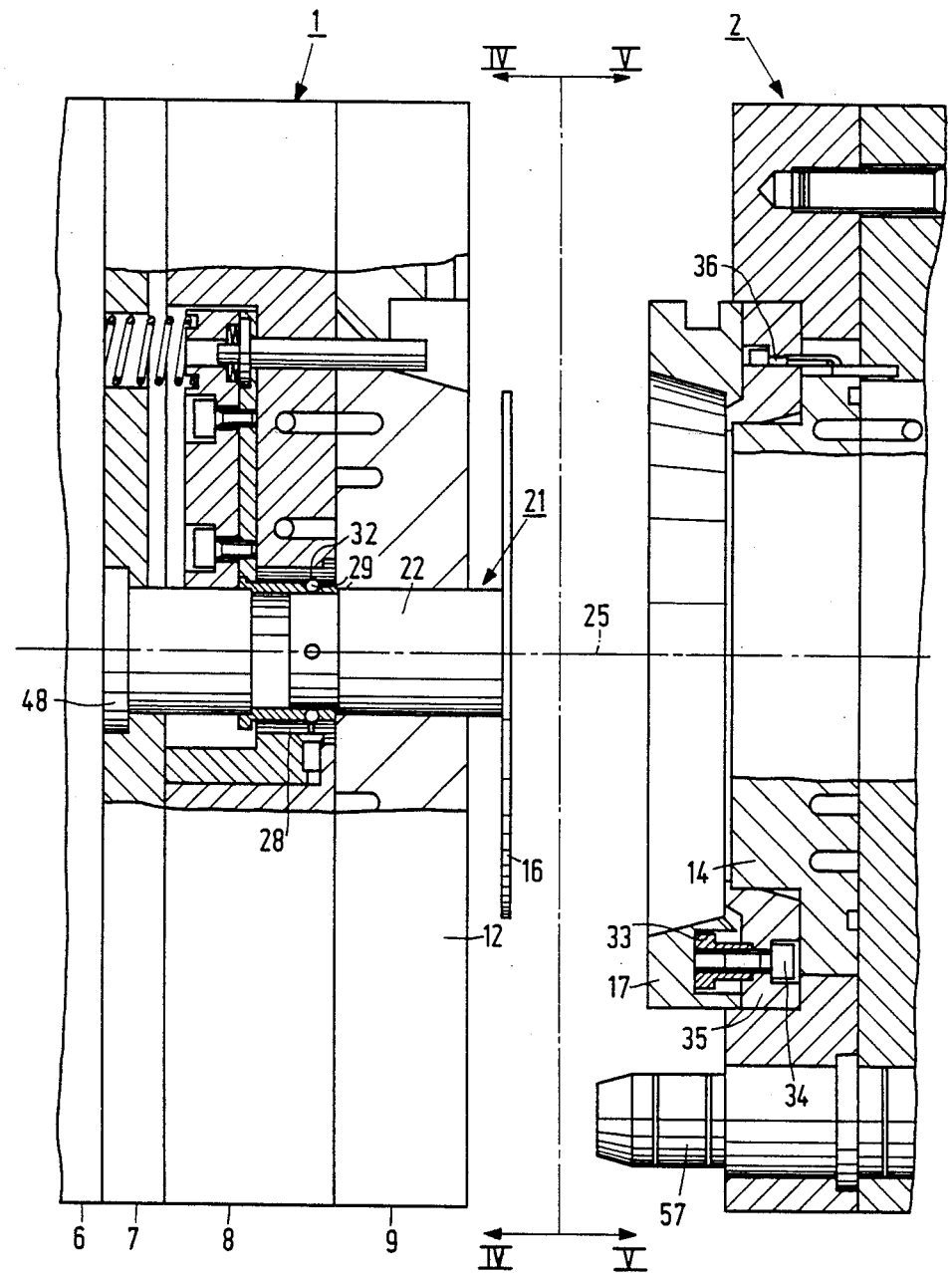
Figure 3:
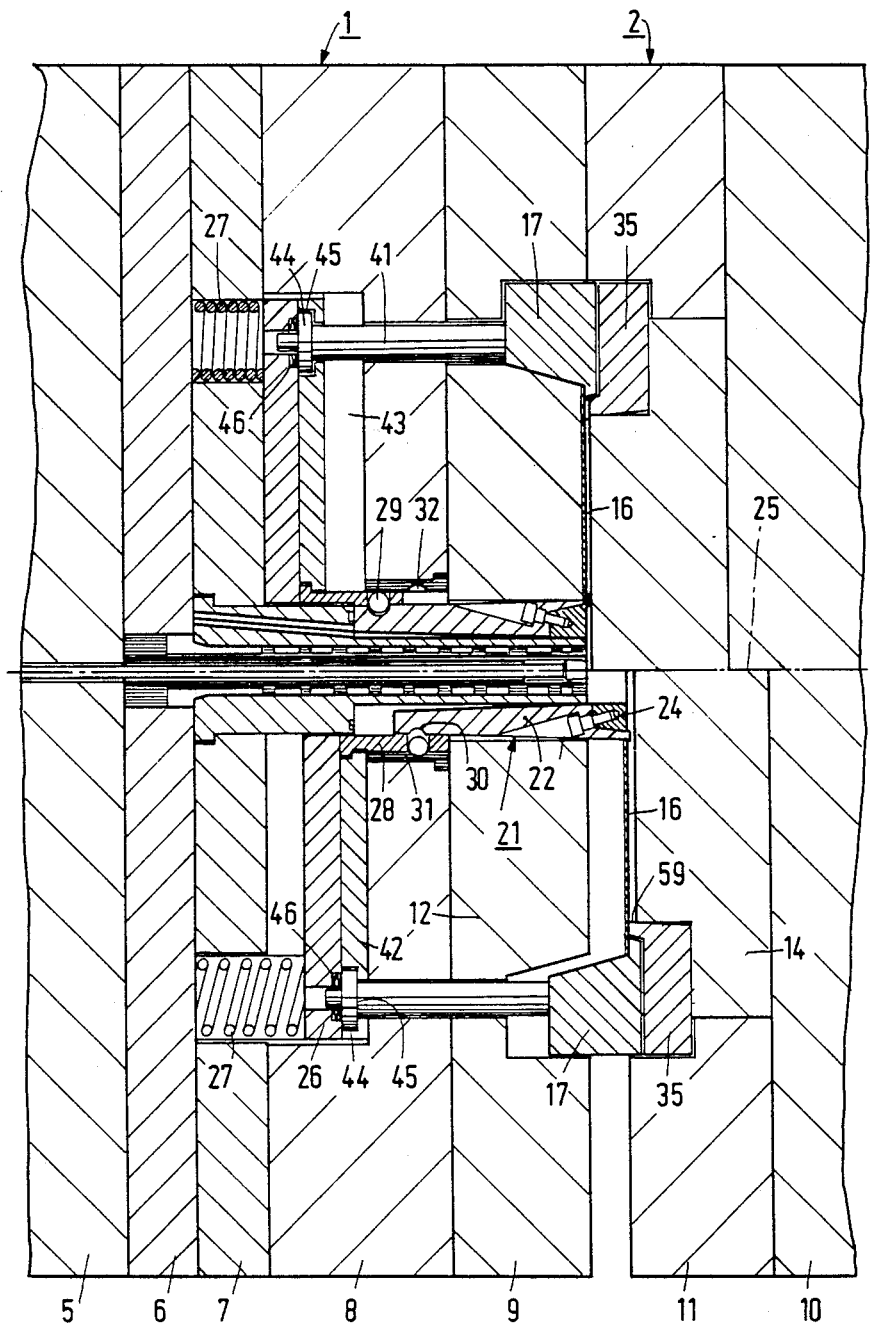
Figure 4:
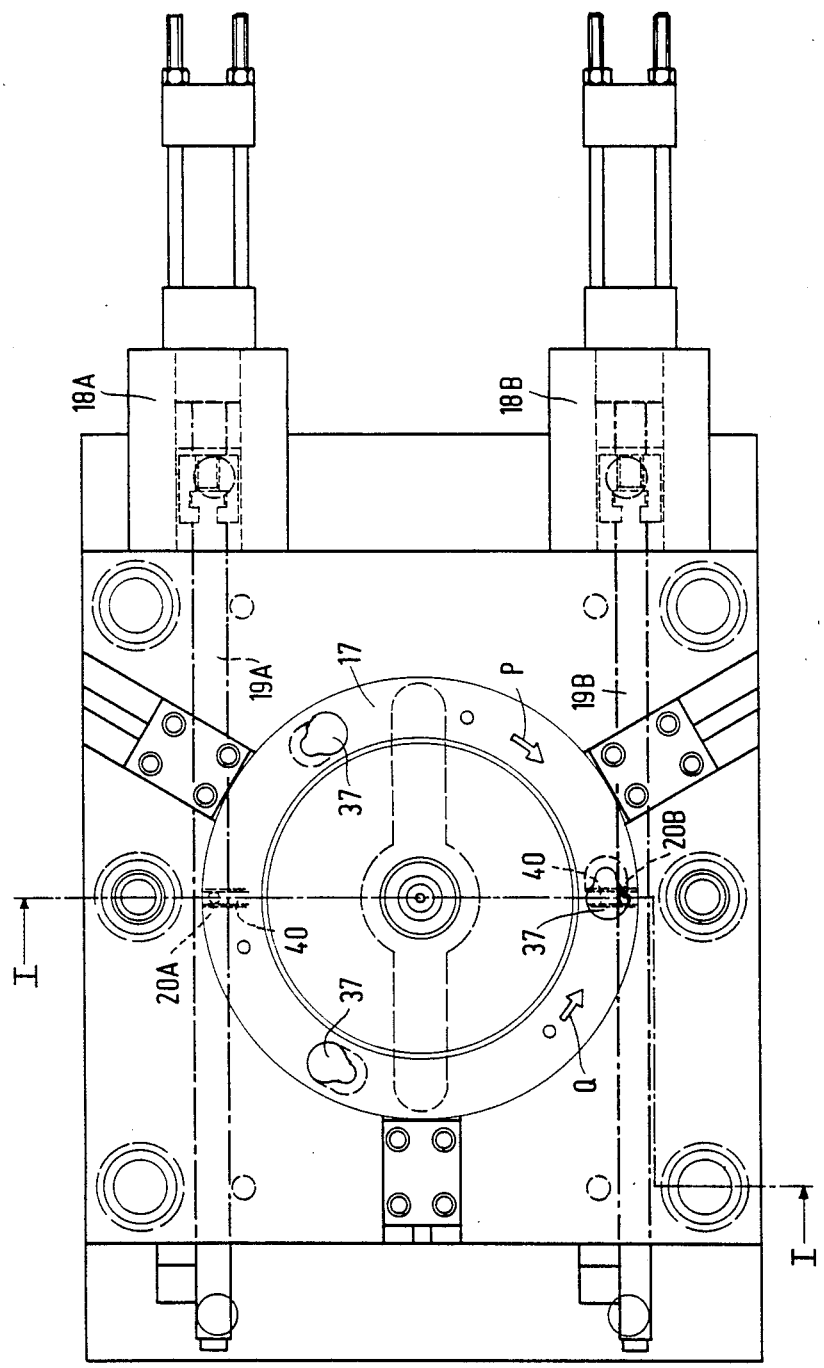
Figure 5:
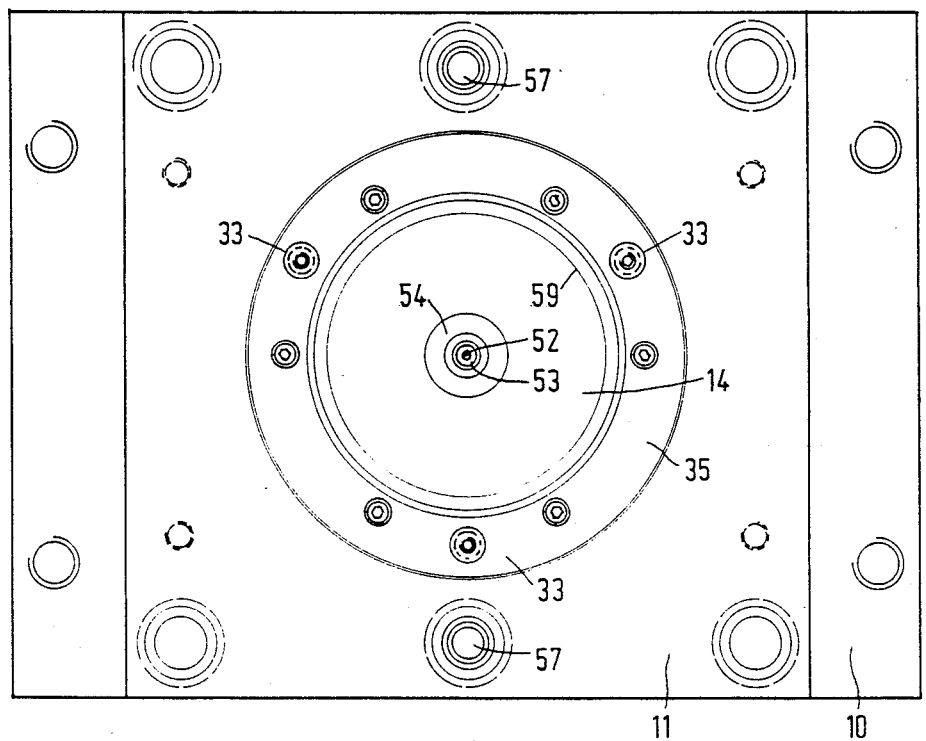
Figure 6:
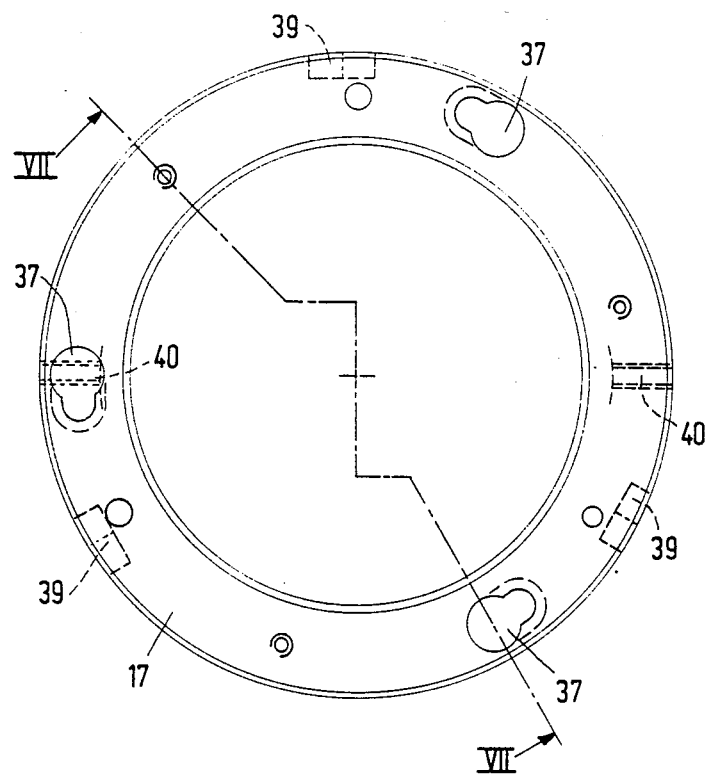
Figure 7:
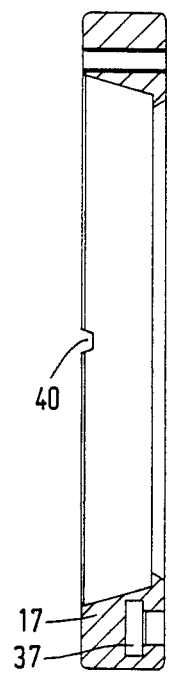
Figure 8:
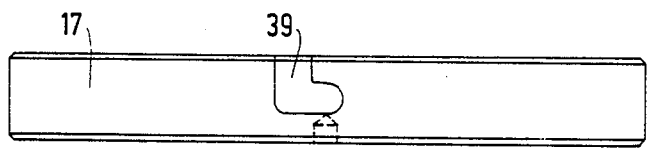

An embodiment of an injection-moulding device in accordance with the invention will now be described in more detail, by way of example, with reference to the accompanying drawings, in which:

FIG. 1 is a sectional view of an injection-moulding device in the closed position, FIG. 2 is a sectional view of the injection-moulding device of FIG. 1 in the open position with the guard ring coupled to the second mould section, FIG. 3 shows a part of the sectional view of FIG. 1 to a slightly enlarged scale, the upper part of the Figure illustrating the situation in the closed position and the lower part of the Figure illustrating the situation in the partly open position, FIG. 4 is a view taken on the lines IV—IV in FIG. 2, FIG. 5 is a view taken on the lines V—V in FIG. 2, FIG. 6 is a slightly enlarged plan view of the guard ring, FIG. 7 is a sectional view taken on the lines VII—VII in FIG. 6, and FIG. 8 is a view of the guard ring taken on the line VIII—VIII in FIG. 6.

The injection-moulding device comprises a mould having a first mould section 1 and a second mould section 2. The injection-moulding device is constructed to be mounted in a suitable injection-moulding machine in the customary manner. Since the injection-moulding machine as such falls beyond the scope of the present invention, it is not shown in the drawing. In this respect it is to be noted only that the injection-moulding machine is provided with flat plates on which the mould sections 1 and 2 can be mounted. Said plates can generally be translated relative to one another along an accurately defined path by means of hydraulic devices, to open the mould. Further, the injection-moulding machine is provided with the necessary means for melting, maintaining the temperature of and pressurising the synthetic material which can be injected into the mould cavity 3 of the moulding device. The injection-moulding machine, not shown, further comprises means for actuating a product ejector 4, whose operation and function will be described hereinafter.

The mould section 1 comprises a number of plates 5 to 9 which are secured to one another in a manner as is customary in the prior art. The second mould section 2 comprises the plates 10 and 11. In a space in the plate 9 the first mould section is provided with a first mirror plate 12 which is formed with a plurality of ducts 13 for the supply of a heating medium and, if required, a cooling medium. Similarly, in a cavity of the plate 11, the second mould section is provided with a second mirror plate 14 with ducts 15.

At a first side the mould cavity is bounded by a stamper 16 which is detachably secured to the mirror plate 12. In an operating position, see FIG. 1, the periphery of the stamper is covered by a guard ring 17 which is detachable from the first mould section 1. A quick-fastening device is provided to enable the guard ring 17 to be rapidly secured to the first mould section. The quick-fastening device will be described in more detail hereinafter. Here it is to be noted that the quick-fastening device comprises two pneumatic motors 18A and 18B, see in particular FIG. 4, which by means of slidable rods 19A and 19B comprising a pin 20A and 20B respectively can impose a limited rotary movement on the guard ring 17.

For coupling the guard ring 17 to the second mould section 2, at least when the mould is substantially closed, a coupling device is provided. Normally, the guard ring 17 is always coupled to the mould section 1, even if the mould is open. Only when the stamper 16 is replaced is the guard ring 17 temporarily coupled to the mould section 2, see FIG. 2. The coupling device will be described in more detail hereinafter.

In known manner the stamper 16 comprises a shell or disc which is made of a nickel-alloy by electro-forming and which at its side facing the mould cavity is provided with an information structure having dimensions of the order of 1 to 2 microns. This structure is the complement of the information structure to be formed in the optical disc. Since the injection-moulding device being described is constructed to manufacture CD records which, as is known, are provided with an information structure on one side only, no stamper is arranged on the mirror plate 14 at the side of the second mould section. In principle, an entirely flat stamper, which is not provided with an information structure, may be used. However, in the present embodiment this is not the case and at the second side the mould cavity is bounded by the flat polished front side of the mirror plate 14.

The stamper 16 is detachably secured to a stamper support 21. This support comprises a changer sleeve 22 to which a clamping ring 24 is fixed by means of a number of bolts 23 which extend obliquely. The stamper 16 has a centre hole and is clamped between the changer sleeve 22 and the clamping ring 24. For this, see in particular FIG. 3.

The stamper support 21 is constructed to cooperate with a stamper changer provided on the first mould section 1. This changer comprises a thrust plate 26 which is axially movable along the central axis 25 of the moulding device, a plurality of compression springs 27 which act between the plate 6 and the thrust plate 26, and a ball bushing 28 which is connected to the thrust plate 26. At its circumference the ball bushing is formed with a plurality of bores in which balls 29 are situated. At its free end, which is situated to the left in the drawing, the changer sleeve 22 is formed with an annular groove 30 adapted to the balls 29. When the stamper support—see FIG. 1 and the upper part of FIG. 3—is mounted the balls 29 are retained between the changer sleeve 22 and a bushing 31 mounted in the plate 8. At its inner circumference the latter bushing has an annular groove 32 adapted to the balls 29. The balls 29 and the two annular grooves 30 and 32 are dimensioned in such a way that when the thrust plate 26 is in the changing position, see FIG. 2 and the lower part of FIG. 3, the balls do not obstruct axial movement of the changer sleeve 22. For controlling the movements of the stamper changer the present embodiment of the device does not need a separate actuating mechanism. This is an important advantage. As will be explained hereinafter, the movement of the stamper support is obtained automatically when the mould is opened and closed, provided that the guard ring 17 has been rotated out of its operating position by means of the sliding rods 19A and 19B.

The guard ring 17 is coupled to the second mould section 2 in a position which is exactly coaxial with the operating position. In other words: it is coaxial with the central axis 25. The coupling means comprise three round bayonet heads 33 which are secured to a counter-ring 35 facing the guard ring 17 by means of bolts 34. The counter-ring is secured to the mirror plate 14 by means of a plurality of bolts 36 and is thus rigidly connected to a second mould section 2. The coupling means for coupling the guard ring to the second mould section also comprise three corresponding bayonet slots 37 in the guard ring 17. For this, see in particular FIGS. 6 and 7.

Apart from the coupling device, the quick-fastening device also comprises a bayonet coupling. This coupling comprises three stationary pins 38 secured to the plate 12 of the first mould section. The pins 38 are engageable in substantially L-shaped bayonet slots 39 formed in the periphery of the guard ring 17, see in particular FIGS. 6 and 8. As already stated, the quick-fastening comprises pneumatic motors 18A and 18B and sliding rods 19A and 19B which are each provided with a pin 20A and 20B respectively. Each of the pins is adapted to cooperate with a corresponding slot 40 in the guard ring 17, for this see FIGS. 6 and 7.

In the situation shown in FIG. 4 the sliding rods 19A and 19B and the guard ring 17 are in the operating position. In this position the first bayonet coupling comprising the pins 38 and the bayonet slots 39 is closed and the second bayonet coupling comprising the bayonet heads 33 and the bayonet slots 37 is open. The coupling position is attained by rotating the guard ring clockwise in FIG. 4. This is achieved by moving the sliding rod 19A to the right and simultaneously moving the sliding rod 19B to the left. As a result of the rotary movement the bayonet heads 33 of the second bayonet coupling engage in the bayonet slots 37 of the guard ring. At the same time the bayonet pins 38 of the first bayonet slots 39 which opens towards the edge of the guard ring, so that when the mould opens the guard ring remains coupled to the second mould section and is disengaged from the first mould section.

In this way it is possible to couple the guard ring alternately to one mould section or the other in a rapid and automatic manner, so that the guard ring need not be manipulated by hand.

The stamper support 21, as already stated, can be locked in the first mould section by means of the ball bushing 28 with the balls 29, which is moved by the thrust plate 26. For moving the thrust plate 26 thrust pins 41 are adapted to cooperate with the guard ring 17, see in particular FIGS. 1 and 2 and the upper part of FIG. 3. When the guard ring 17 is in the operating position the end of the thrust pin 41 which is directed to the right in the drawing presses against a radial face of the guard ring. In this situation the compression springs 27 are in a compressed condition. After the guard ring 17 has been rotated in the direction indicated by the arrow P by means of the pneumatic motors 18A and 18B the guard ring will move away from the first mould section when the mould is opened. This movement can be followed by the thrust pins 41 over a part of the travel, so that the thrust plate 26 moves to the right in the drawing. The lower part of FIG. 3 shows the position which the thrust plate 26 may occupy eventually, which final position is determined by the fact that the plate 42 arranged on the thrust plate 26 has come to abutment in the space 43 in the plate 8. The plate 42 allows the thrust pins 41 to pass and has recesses 44 for a round collar 45 of the thrust pins. The collar is loaded by a plurality of cup springs 46.

The movement of the thrust plate 26 causes a movement of the ball-bushing 28 secured to it, so that this bushing moves towards the position shown in the lower part of FIG. 3 and on its way moves the changer sleeve 22 to the right. By further opening the mould the situation of FIG. 2 is obtained, in which the stamper 16 together with the stamper support 21 can readily be removed from the first mould section 1. This removal is simplified by the fact that at its inner side the changer sleeve is formed with a central through-bore which is engageable by a pin of suitable diameter and shape to remove the stamper support with the stamper from the first mould section. After the stamper support with the stamper has been replaced by a new stamper support with stamper the mould is closed and the cycle of operations is reversed. The stamper support is automatically locked in the first mould section and the guard ring is automatically coupled to the first mould section by means of the coupling device.

A guide bushing 47 arranged in the centre of the first mould section 1 extends up to the mould cavity. The guide bushing 47 in its turn is arranged in a casing 48 which also extends up to the mould cavity. At the side of the mould cavity the casing 48 very accurately adjoins the clamping ring 24 with such a small clearance that no synthetic material can escape from the mould cavity between said parts. The guide bushing 47 is constructed to guide the product ejector 4. The product ejector is moved by means of a coupling member 49 against the load exerted by a compression spring 50. The displacement of the coupling member 49 is obtained via an actuating rod 51 which is actuated by the injection-moulding machine, not shown. After every production cycle the mould opens and the disc formed in the mould cavity 3 is pressed away from the stamper 16 by a movement to the right of the product ejector 4.

In the second mould section an injection duct 52 is formed in a sleeve 53. At the left this sleeve adjoins a heating jacket 54 formed with ducts 55 for a heating medium. At the left the injection duct 52 terminates in the mould cavity and at the right it terminates in a thrust member 56 which is adapted to cooperate with a thrust portion of the injection-moulding device.

In order to ensure that the two mould sections correctly register in the closed position, a plurality of locating pins 47 are arranged on the second mould section, which pins engage corresponding bores 58 in the first mould section.

The method in accordance with the invention will now be described hereinafter. By means of the injection-moulding device shown it is possible to manufacture disc records, for example CD records, in production runs which each comprise a plurality of production cycles. Each production cycle comprises the steps: closing the mould—injecting and cooling the synthetic material—opening the mould and removing the product. In FIG. 1 the mould is in the closed condition, so that synthetic material may be injected. The injection-moulding machine forces the molten synthetic material into the mould cavity 3 through the injection duct 52. At the first side the mould cavity is bounded by the stamper 16 and at the second side by the mirror plate 14. At the periphery sealing is achieved by a rim 59 of the counter ring 35, which rim presses against the stamper 16. Separate means may be provided for venting the mould cavity, but it is alternatively possible that the clearance between the various parts enables the passage of the air which is forced away by the liquid synthetic material. The walls of the mould cavity, in particular the stamper 16 and the mirror plate 14, are at a lower temperature than the injected molten synthetic material, causing the material to solidify in the mould cavity. After a preset time the mould cavity is opened, namely over a distance of substantially 200 mm. This distance between the mould sections 1 and 2 corresponds to the distance indicated in FIG. 2. The product ejector 4 is actuated and consequently moved to the right, after which the disc thus formed can be removed. Subsequently, the mould closes again and a new cycle commences.

After termination of a production run the stamper is changed. The last disc of the production run is removed from the open mould, after which the mould is closed again but now with substantially zero closing pressure. In this situation the pneumatic motors 18A and 18B are energised, causing the guard ring 17 to be rotated in the direction indicated by the arrow P (FIG. 4) in a manner as described hereinbefore and the guard ring to be automatically coupled to the second mould section and at the same time to be disengaged from the first mould section. As the mould opens further, the situation of FIG. 3 is obtained. Indeed, as already described in the foregoing, the thrust pins 41 will follow the movement of the guard ring 17 to the right and so does the stamper support 21. As the mould opens still further, the stamper support is left behind, so that the situation of FIG. 2 is obtained. The stamper 16 together with the stamper support 21 can now be removed and be replaced by another stamper with associated stamper support. Subsequently, the mould is closed. At a given instant the guard ring 17 abuts against the thrust pins 41 and the stamper support 21 is pulled to the left in the manner described in the foregoing and is locked in the final position. When the mould is closed but the closing pressure is low or zero the couling device is actuated in the reverse sequence, so that the guard ring 17 is rotated in the direction indicated by the arrow Q (FIG. 4) and is again coupled to the first mould section and disengaged from the second mould section. Immediately after this the closing pressure may be increased to the pressure necessary for injection-moulding and the first starting run may commence. A starting run is now performed, which run comprises starting cycles comprising the same steps as the said production cycles but yielding a reject product. After the starting run has ended the new production run is started.

In accordance with the invention the entire process is carried out under control of a control device which automatically controls the sequence of successive production runs, stamper changes and starting runs. Many modern injection-moulding machines comprise computer-controlled programmable automatic control devices, provided with one or more microprocessors, for controlling the production runs. It is possible to adapt the program of such known control devices to automatically carry out said operations necessary for changing the stamper. However, in accordance with the invention a further automation is possible, namely automatically removing the product from the mould by means of a mechanical product manipulator and automatically changing the stampers by means of a mechanical stamper manipulator. Such manipulators may be of a conventional type and are generally referred to as robots. Again controlling is possible by the injection-moulding machine control means or by a separate control device which is coupled thereto. Every stamper change is carried out within a fixed time interval and comprises the aforementioned steps: coupling the guard ring to the second mould section towards the end of the last production cycle of the production run by actuating the fastening device and the coupling device, disengaging the stamper support from the first mould section after removal of the last product of the production run from the open mould by actuating the quick-fastening device, removing the stamper support with the stamper from the first mould section with the stamper manipulator, mounting the next stamper support with the next stamper on the first mould section by means of the stamper manipulator, locking the stamper support in the first mould section by actuating the quick-fastening device and fastening the guard ring to the first mould section by actuating the quick-fastening device.

The manipulators are not shown in the drawings and are in itself irrelevant to the invention. Many types of robots are commercially available, which are provided with microcomputers which can be programmed to perform the required tasks, being removal of the products and changing of the stampers. For removing products from the injection-moulding machines special mechanical manipulators are known, which are coupled directly to the movement of one mould section relative to the other. This enables the manipulator to move already into the space between the two mould sections at the instant at which the mould is still being opened and after gripping the product to leave the space not until the mould is being closed. The time needed for removing the product from the mould is thus minimised, thereby reducing the cycle time. It is also possible to use only a single robot which is capable both of removing the products and of changing the stamper. Some robots are capable of operating with a plurality of gripping members which can be changed automatically. During production cycles such a robot may operate with a gripping member for products and may automatically change the gripping member in the case of a stamper change to perform this change.

Preferably, the starting runs comprise a fixed number of starting cycles programmed on the control device. In order to minimise the length of the starting run it is important to preheat the stampers and to keep them at hand in the preheated condition for the stamper change. As already stated, the stampers can be mounted on a stamper support 21 in an air-conditioned space, to be subsequently loaded into a magazine which can be closed in a dust-tight manner and which is placed in the direct proximity of the injection-moulding device. The robot which automatically performs the stamper change can be programmed to open the magazine to introduce a stamper therein and subsequently to remove a new stamper therefrom fully independently. Since the magazine has to be opened briefly for this purpose, it is important to arrange the magazine at a location which is surrounded by substantially dust-free air, at least at the location of the mould cavity.

The injection-moulding device in accordance with the invention can be operated continuously, in which case it will be advantageous if the magazines are transferred automatically to the injection-moulding machine, for example by means of a computer-controlled conveyer belt, which may be arranged in a tunnel, which at least in the proximity of the injection-moulding device is maintained at the correct temperature.

What is claimed is:

1. In a method of manufacturing discs, with an information structure on one side, from a synthetic material by an injection molding device, the injection molding device comprising:
   a mold having a first mold section (1) and a second mold section (2) which are movable relative to one another between an open and a closed position, a mold cavity (3) is defined between the mold sections in the closed position, and the synthetic material is injected into the cavity to form said discs,
   a flat mirror plate (12) located on the first mold section,
   a disc-shaped stamper (16) bounds a first side of the mold cavity and the disc-shaped stamper is detachably secured to the mirror plate (12),
   a guard ring (17), detachable from the first mold section, covering the periphery of the stamper (16) in an operating position,
   a quick-fastening device (18-20) cooperating with the guard ring (17) for rapidly securing the guard ring to the first mold section in the operating position,
   a coupling device (33, 37) coupling the guard ring (17) to the second mold section (2) in the closed position of the mold, and
   said stamper (16) being detachably secured to a stamper support (21), the stamper support cooperates with a stamper changer (26-32) provided on the first mold half (1) for changing the stamper when the mold is in the open position and the guard ring (17) is coupled to the second mold section (2),
   the method comprising a number of production runs comprising a plurality of production cycles, each production cycle, comprising the following steps: closing the mold, injecting and cooling the synthetic material, opening the mold, and removing the disc, the stamper being changed after every production run, after the stamper is changed a starting run is performed, said starting run comprising a plurality of starting cycles comprising the same steps as the production cycles but yielding a reject product, after the starting run, a next production run commences, the improvement comprising
   the automatically controlling of a sequence of successive production runs, stamper changes and starting runs,
   each stamper change is carried out within a fixed time interval and comprises the following steps: coupling the guard ring (17) to the second mold section (2) towards the end of the last production cycle of a production run by actuating the quick-fastening device (18-20) and the coupling device (33, 37), opening the mold releasing the stamper support (21) from the first mold section (1) by actuating the quick-fastening device after removal of the last disc of the production run from the open mold, removing the stamper support with the stamper from the first mold section by a stamper manipulator, positioning a next stamper support with a next stamper on the first mold section by the stamper manipulator, securing said next stamper support to the first mold section by actuating the quick-fastening device, and securing the guard ring to the first mold section by actuating the coupling device and quick-fastening device prior to the beginning of the starting cycle of the next starting run.

2. A method as claimed in claim 1, wherein each starting run comprises an equal fixed number of starting cycles.

3. A method as claimed in claim 2, wherein the next stamper is maintained in a preheated condition in a direct proximity to the mold.

4. A method as claimed in claim 1, wherein while the next stamper is positioned on the stamper support in an air-conditioned space and is loaded into a magazine which can be closed in a dust-tight manner, the closed dust-tight magazine which is loaded is placed at a predetermined location near the injection molding device, and the stamper support with the stamper is not removed from the magazine until a stamper change is to be performed and is not re-inserted therein until after termination of the production run.

5. A method as claimed in claim 4, wherein automatic transfer means are provided to transfer the magazine between the air-conditioned space and the predetermined location.

* * * * *